United States Patent
Kelma et al.

(10) Patent No.: US 8,385,219 B2
(45) Date of Patent: *Feb. 26, 2013

(54) UPSTREAM BANDWIDTH LEVEL MEASUREMENT DEVICE

(75) Inventors: David Kelma, Madisonville, TN (US); Tab Kendall Cox, Baldwinsville, NY (US)

(73) Assignee: John Mezzalingua Associates, Inc., E. Syracuse, NY (US)

( * ) Notice: Subject to any disclaimer, the term of this patent is extended or adjusted under 35 U.S.C. 154(b) by 663 days.

This patent is subject to a terminal disclaimer.

(21) Appl. No.: 12/576,657

(22) Filed: Oct. 9, 2009

(65) Prior Publication Data

US 2011/0085452 A1     Apr. 14, 2011

(51) Int. Cl.
*H04L 12/26* (2006.01)
*H04N 7/173* (2011.01)

(52) U.S. Cl. .......................... 370/252; 725/107; 725/121

(58) Field of Classification Search ........................ None
See application file for complete search history.

(56) References Cited

U.S. PATENT DOCUMENTS

| | | |
|---|---|---|
| 3,790,909 A | 2/1974 | Le Fevre |
| 4,418,424 A | 11/1983 | Kawamoto et al. |
| 4,512,033 A | 4/1985 | Schrock |
| 4,520,508 A | 5/1985 | Reichert, Jr. |
| 4,521,920 A * | 6/1985 | Forsberg et al. ............... 398/214 |
| 4,648,123 A | 3/1987 | Schrock |
| 4,677,390 A | 6/1987 | Wagner |
| 4,961,218 A | 10/1990 | Kiko |
| 4,982,440 A | 1/1991 | Dufresne et al. |
| 5,010,399 A | 4/1991 | Goodman et al. |
| 5,126,840 A | 6/1992 | Dufresne et al. |
| 5,214,505 A | 5/1993 | Rabowsky et al. |
| 5,231,660 A | 7/1993 | West, Jr. |
| 5,235,612 A | 8/1993 | Stilwell et al. |
| 5,345,504 A | 9/1994 | West, Jr. |
| 5,361,394 A | 11/1994 | Shigihara |
| 5,369,642 A | 11/1994 | Shioka et al. |
| 5,389,882 A * | 2/1995 | I'Anson et al. ............... 370/252 |
| 5,548,255 A | 8/1996 | Spielman |
| 5,745,836 A | 4/1998 | Williams |
| 5,815,794 A * | 9/1998 | Williams ....................... 725/125 |

(Continued)

FOREIGN PATENT DOCUMENTS

| | | | |
|---|---|---|---|
| JP | 55080989 A | | 6/1980 |
| JP | 55132126 A | | 10/1980 |

(Continued)

OTHER PUBLICATIONS

International Searching Authority/US, International Search Report and Written Opinion dated Dec. 18, 2009 (7 pgs).

*Primary Examiner* — Timothy J Weidner

(74) *Attorney, Agent, or Firm* — Schmeiser, Olsen & Watts, LLP

(57) ABSTRACT

A measurement device is provided for measuring an upstream bandwidth. The measurement device includes a return path extending at least a portion of a distance between a supplier side connector and a user side connector. A coupler is connected within the return path, the coupler providing a secondary path. A detection circuit is connected electrically downstream the coupler. A level detector is connected electrically downstream the detection circuit, and a microprocessor is connected electrically downstream the level detector. The microprocessor includes a first buffer and a second buffer.

11 Claims, 14 Drawing Sheets

U.S. PATENT DOCUMENTS

| | | | |
|---|---|---|---|
| 5,839,052 A | 11/1998 | Dean et al. | |
| 5,893,024 A | 4/1999 | Sanders et al. | |
| 5,937,330 A | 8/1999 | Vince et al. | |
| 5,950,111 A | 9/1999 | Georger et al. | |
| 5,956,075 A | 9/1999 | Matsuo | |
| 5,970,053 A | 10/1999 | Schick et al. | |
| 6,014,547 A | 1/2000 | Caporizzo et al. | |
| 6,049,693 A | 4/2000 | Baran et al. | |
| 6,069,960 A | 5/2000 | Mizukami et al. | |
| 6,094,211 A | 7/2000 | Baran et al. | |
| 6,160,990 A | 12/2000 | Kobayashi et al. | |
| 6,205,138 B1 | 3/2001 | Nihal et al. | |
| 6,253,077 B1 | 6/2001 | Burt et al. | |
| 6,348,837 B1 | 2/2002 | Ibelings | |
| 6,348,955 B1 | 2/2002 | Tait | |
| 6,373,349 B2 | 4/2002 | Gilbert | |
| 6,377,316 B1 | 4/2002 | Mycynek et al. | |
| 6,388,539 B1 | 5/2002 | Rice | |
| 6,425,132 B1 | 7/2002 | Chappell | |
| 6,495,998 B1 | 12/2002 | Terreault | |
| 6,498,925 B1 | 12/2002 | Tauchi | |
| 6,510,152 B1 | 1/2003 | Gerszberg et al. | |
| 6,560,778 B1 | 5/2003 | Hasegawa | |
| 6,570,914 B1 * | 5/2003 | Ichihara | 375/224 |
| 6,570,928 B1 | 5/2003 | Shibata | |
| 6,587,012 B1 | 7/2003 | Farmer et al. | |
| 6,622,304 B1 | 9/2003 | Carhart | |
| 6,640,338 B1 | 10/2003 | Shibata | |
| 6,678,893 B1 | 1/2004 | Jung | |
| 6,683,513 B2 | 1/2004 | Shamsaifar et al. | |
| 6,725,462 B1 | 4/2004 | Kaplan | |
| 6,725,463 B1 | 4/2004 | Birleson | |
| 6,728,968 B1 | 4/2004 | Abe et al. | |
| 6,757,910 B1 | 6/2004 | Bianu | |
| 6,804,828 B1 | 10/2004 | Shibata | |
| 6,845,232 B2 | 1/2005 | Darabi | |
| 6,877,166 B1 | 4/2005 | Roeck et al. | |
| 6,880,170 B1 * | 4/2005 | Kauffman et al. | 725/125 |
| 6,928,175 B1 | 8/2005 | Bader et al. | |
| 7,003,275 B1 | 2/2006 | Petrovic | |
| 7,029,293 B2 | 4/2006 | Shapson et al. | |
| 7,039,432 B2 | 5/2006 | Strater et al. | |
| 7,162,731 B2 | 1/2007 | Reidhead et al. | |
| 7,167,693 B2 * | 1/2007 | Bachman et al. | 455/127.1 |
| 7,283,479 B2 | 10/2007 | Ljungdahl et al. | |
| 7,454,252 B2 | 11/2008 | El-Sayed | |
| 7,505,819 B2 | 3/2009 | El-Sayed | |
| 7,530,091 B2 | 5/2009 | Vaughan | |
| 7,603,693 B2 | 10/2009 | Masuda et al. | |
| 7,742,777 B2 | 6/2010 | Strater et al. | |
| 7,748,023 B2 | 6/2010 | Weinstein et al. | |
| 8,001,579 B2 | 8/2011 | Olson et al. | |
| 8,213,457 B2 | 7/2012 | Kelma et al. | |
| 2001/0016950 A1 | 8/2001 | Matsuura | |
| 2002/0141347 A1 | 10/2002 | Harp et al. | |
| 2002/0141494 A1 | 10/2002 | Chappell | |
| 2002/0144292 A1 | 10/2002 | Uemura et al. | |
| 2002/0166124 A1 | 11/2002 | Gurantz et al. | |
| 2002/0174435 A1 | 11/2002 | Weinstein et al. | |
| 2004/0076192 A1 * | 4/2004 | Zerbe et al. | 370/516 |
| 2004/0172659 A1 | 9/2004 | Ljungdahl et al. | |
| 2004/0229561 A1 | 11/2004 | Cowley et al. | |
| 2005/0034168 A1 | 2/2005 | Beveridge | |
| 2005/0155082 A1 | 7/2005 | Weinstein et al. | |
| 2005/0183130 A1 | 8/2005 | Sadja et al. | |
| 2005/0283815 A1 | 12/2005 | Brooks et al. | |
| 2005/0289632 A1 | 12/2005 | Brooks et al. | |
| 2006/0015921 A1 | 1/2006 | Vaughan | |
| 2006/0148406 A1 | 7/2006 | Strater et al. | |
| 2006/0205442 A1 | 9/2006 | Phillips et al. | |
| 2006/0282871 A1 | 12/2006 | Yo | |
| 2007/0288981 A1 | 12/2007 | Mitsuse et al. | |
| 2007/0288982 A1 | 12/2007 | Donahue | |
| 2008/0022344 A1 | 1/2008 | Riggsby | |
| 2008/0040764 A1 | 2/2008 | Weinstein et al. | |
| 2008/0075012 A1 * | 3/2008 | Zielinski et al. | 370/241 |
| 2008/0127287 A1 | 5/2008 | Alkan et al. | |
| 2009/0031391 A1 | 1/2009 | Urbanek | |
| 2009/0047917 A1 | 2/2009 | Phillips et al. | |
| 2009/0077608 A1 | 3/2009 | Romerein et al. | |
| 2009/0154369 A1 * | 6/2009 | Helvig et al. | 370/252 |
| 2009/0316608 A1 | 12/2009 | Singh et al. | |
| 2009/0320085 A1 * | 12/2009 | Wang | 725/125 |
| 2010/0100912 A1 | 4/2010 | Olson et al. | |
| 2010/0100921 A1 | 4/2010 | Olson et al. | |
| 2010/0266000 A1 | 10/2010 | Froimovich et al. | |
| 2011/0085480 A1 | 4/2011 | Kelma et al. | |
| 2011/0085586 A1 | 4/2011 | Kelma et al. | |
| 2011/0088077 A1 | 4/2011 | Kelma et al. | |

FOREIGN PATENT DOCUMENTS

| | | |
|---|---|---|
| JP | 57091055 A | 6/1982 |
| JP | 58101582 U | 6/1983 |
| JP | 61157035 A | 7/1986 |
| JP | 0519141 A | 7/1993 |
| JP | 07038580 A | 2/1995 |
| JP | 11069334 A | 3/1999 |
| JP | 2004080483 A | 3/2004 |
| JP | 2005005875 A | 1/2005 |
| JP | 2007166109 A | 6/2007 |
| JP | 2007166110 A | 6/2007 |
| WO | WO-002412 A1 | 4/2000 |
| WO | WO-0172005 A1 | 9/2001 |
| WO | WO-0233969 A1 | 4/2002 |
| WO | WO-02091676 A1 | 11/2002 |

* cited by examiner

UPSTREAM BANDWIDTH LEVEL MEASUREMENT DEVICE

FIELD OF THE INVENTION

The present invention relates generally to signal level measurement devices for use in community antenna television ("CATV") systems, and in particular to signal level measurement devices for measuring the level of a desirable upstream bandwidth created by devices attached to the CATV system within the premise of a user.

BACKGROUND OF THE INVENTION

The use of a CATV system to provide internet, voice over internet protocol ("VOIP") telephone, television, security, and music services is well known in the art. In providing these services, a downstream bandwidth (i.e., radio frequency ("RF") signals, digital signals, and/or optical signals) is passed from a supplier of the services to a user, and an upstream bandwidth (i.e., radio frequency ("RF") signals, digital signals, and/or optical signals) is passed from the user to the supplier. For much of the distance between the supplier and the user, the downstream bandwidth and the upstream bandwidth make up a total bandwidth that is passed via a signal transmission line, such as a coaxial cable. The downstream bandwidth is, for example, signals that are relatively higher in frequency within the total bandwidth of the CATV system while the upstream bandwidth is, for example, signals that are relatively lower in frequency.

Traditionally, the CATV system includes a head end facility, where the downstream bandwidth is initiated into a main CATV distribution system, which typically includes a plurality of trunk lines, each serving at least one local distribution network. In turn, the downstream bandwidth is passed to a relatively small number (e.g., approximately 100 to 500) of users associated with a particular local distribution network. Devices, such as high-pass filters, are positioned at various points within the CATV system to ensure the orderly flow of downstream bandwidth from the head end facility, through the trunk lines, through the local distribution networks, and ultimately to the users.

In stark contrast to the orderly flow of the downstream bandwidth, the upstream bandwidth passing through each of the local distribution networks is a compilation of an upstream bandwidth generated within a premise of each user that is connected to the particular distribution network. The upstream bandwidth generated within each premise includes desirable upstream information signals from a modem, desirable upstream information signals from a set-top-box, other desirable signals, and undesirable interference signals, such as noise or other spurious signals. Many generators of such undesirable interference signals are electrical devices that inadvertently generate electrical signals as a result of their operation. These devices include vacuum cleaners, electric motors, household transformers, welders, and many other household electrical devices. Many other generators of such undesirable interference signals include devices that intentionally create RF signals as part of their operation. These devices include wireless home telephones, cellular telephones, wireless internet devices, citizens band ("CB") radios, personal communication devices, etc. While the RF signals generated by these latter devices are desirable for their intended purposes, these signals will conflict with the desirable upstream information signals if they are allowed to enter the CATV system.

Undesirable interference signals, whether they are inadvertently generated electrical signals or intentionally created RF signals, may be allowed to enter the CATV system, typically through an unterminated port, an improperly functioning device, a damaged coaxial cable, and/or a damaged splitter. As mentioned above, the downstream/upstream bandwidth is passed through coaxial cables for most of the distance between the user and the head end. This coaxial cable is intentionally shielded from undesirable interference signals by a conductive layer positioned radially outward from a center conductor and positioned coaxially with the center conductor. Similarly, devices connected to the coaxial cable typically provide shielding from undesirable interference signals. However, when there is no coaxial cable or no device connected to a port the center conductor is exposed to any undesirable interference signals and will function like a small antenna to gather those undesirable interference signals. Similarly, a coaxial cable or device having damaged or malfunctioning shielding may also gather undesirable interference signals.

In light of the forgoing, it should be clear that there is an inherent, system-wide flaw that leaves the upstream bandwidth open and easily impacted by any single user. For example, while the downstream bandwidth is constantly monitored and serviced by skilled network engineers, the upstream bandwidth is maintained by the user without the skill or knowledge required to reduce the creation and passage of interference signals into the upstream bandwidth. This issue is further compounded by the number of users connected together within a particular distribution network, especially knowing that one user can easily impact all of the other users.

Attempts at improving an overall signal quality of the upstream bandwidth have not been successful using traditional methods. A measure of the overall signal quality includes such components as signal strength and signal-to-noise ratio (i.e., a ratio of the desirable information signals to undesirable interference signals). Traditionally, increasing the strength of the downstream bandwidth has been accomplished by drop amplifiers employed in or near a particular user's premise. The success of these drop amplifiers is largely due to the fact that there are very low levels of undesirable interference signals present in the downstream bandwidth for the reasons explained more fully above. The inherent presence of the undesirable interference signals in the upstream bandwidth generated by each user has typically precluded the use of these typical, drop amplifiers to amplify the upstream bandwidth, because the undesirable interference signals are amplified by the same amount as the desirable information signals. Accordingly, the signal-to-noise ratio remains nearly constant, or worse, such that the overall signal quality of the upstream bandwidth is not increased when such a typical, drop amplifier is implemented.

For at least the forgoing reasons, a need is apparent for a device, which can measure the level of a desirable upstream bandwidth generated by devices connected to the CATV system within the premise of the user in order to implement conditioning devices, such as terminators and attenuators, to increase the signal-to-noise ratio of the upstream bandwidth.

SUMMARY OF THE INVENTION

The present invention provides a technician with a level of the desirable upstream bandwidth so that the technician can properly apply termination, attenuation or other conditioning devices to condition the upstream bandwidth.

In accordance with one embodiment of the present invention, a measurement device is provided for measuring an upstream bandwidth. The device includes a return path extending at least a portion of a distance between a supplier side connector and a user side connector. A coupler is connected within the return path, the coupler providing a secondary path. A detection circuit is connected electrically downstream the coupler. A level detector is connected electrically downstream the detection circuit, and a microprocessor is connected electrically downstream the level detector. The microprocessor includes a first buffer and a second buffer.

In accordance with one embodiment of the present invention a method is provided for obtaining level data for an upstream bandwidth. The method includes converting a frequency dependent voltage stream into a time dependent voltage stream including periods of increased voltage. The method further includes amplifying and maintaining the periods of increased voltages using a low pass amplifier and a peak detector. The method further includes recording a peak value from a plurality of voltage series from within the output voltage stream, each series beginning with a measured voltage level exceeding a high voltage threshold and ending with a measured voltage level passing below a low voltage threshold. The method further includes placing the peak values in a first buffer, and periodically calculating a first buffer average. The method further includes placing each of the first buffer averages into a second buffer, and periodically calculating a second buffer average. The method further includes outputting at least one of the first buffer average and at least one of the second buffer average to an output device for a review by a technician for a purpose of conditioning the upstream bandwidth.

BRIEF DESCRIPTION OF THE DRAWINGS

For a further understanding of the nature and objects of the invention, references should be made to the following detailed description of a preferred mode of practicing the invention, read in connection with the accompanying drawings in which.

DETAILED DESCRIPTION OF THE INVENTION

Figure 1:
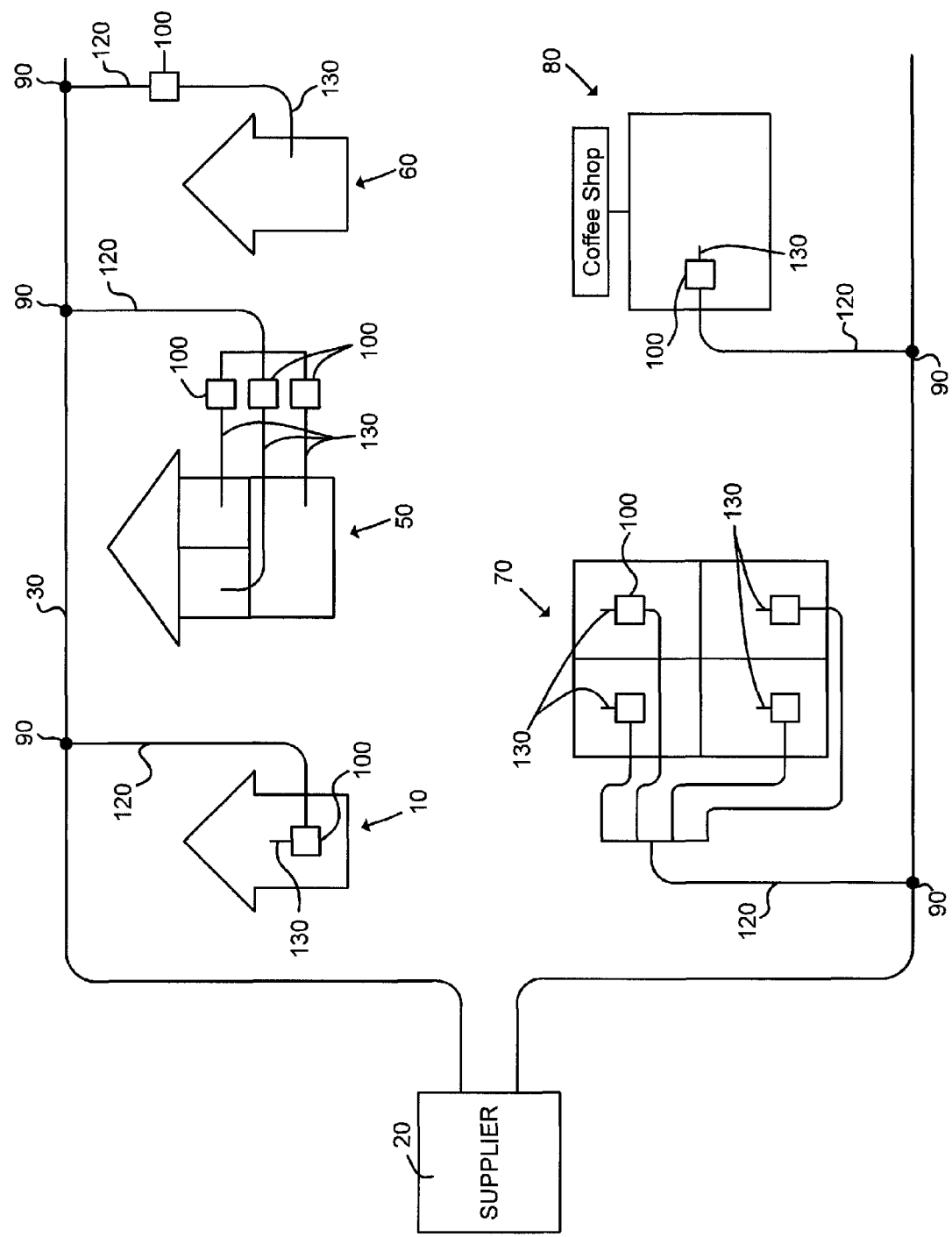
FIG. 1 is a graphical representation of a CATV system arranged in accordance with an embodiment of the present invention.

As shown in FIG. 1, a CATV system typically includes a supplier 20 that transmits a downstream bandwidth, such as RF signals, digital signals, and/or optical signals, to a user through a main distribution system 30 and receives an upstream bandwidth, such as RF signals, digital signals, and/or optical signals, from a user through the same main signal distribution system 30. A tap 90 is located at the main signal distribution system 30 to allow for the passage of the downstream/upstream bandwidth from/to the main signal distribution system 30. A drop transmission line 120 is then used to connect the tap 90 to a house 10, 60 an apartment building 50, 70, a coffee shop 80, and so on. As shown in FIG. 1, an upstream bandwidth conditioning device 100 of the present invention may be connected in series between the drop transmission line 120 and a user's premise distribution system 130.

Referring still to FIG. 1, it should be understood that the upstream bandwidth conditioning device 100 can be placed at any location between the tap 90 and the user's premise distribution system 130. This location can be conveniently located within the premise (e.g., the house 10, the apartment building 70, etc.), or proximate to the premise (e.g., the house 60, the apartment building 50, etc.). It should be understood that the upstream bandwidth conditioning device 100 can be placed at any location, such as the coffee shop 80 or other business, where CATV services, including internet services, VOIP services, or other unidirectional/bidirectional services are being used.

Figure 2:
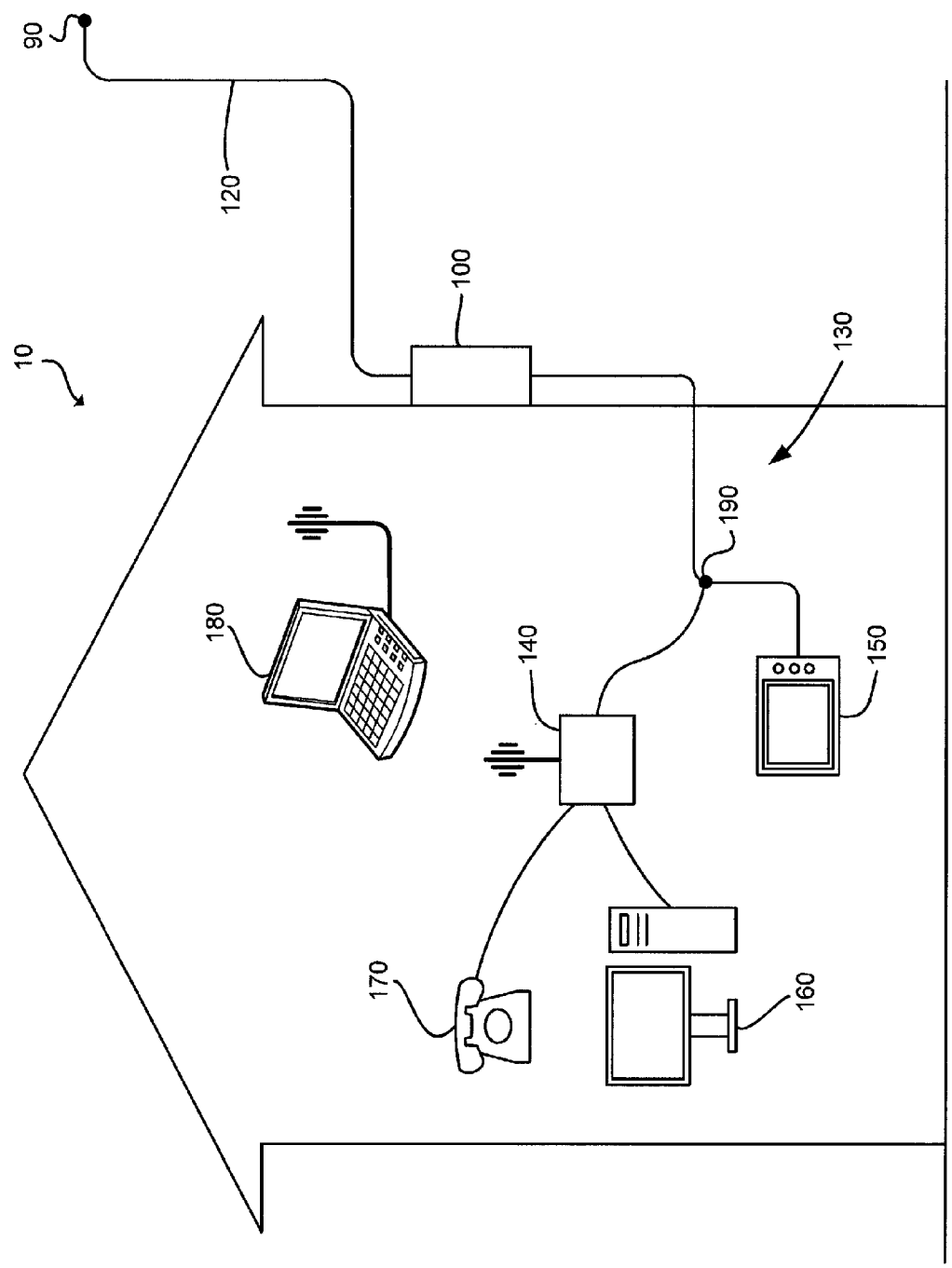
FIG. 2 is a graphical representation of a user's premise arranged in accordance with an embodiment of the present invention.

As shown in FIG. 2, the user's premise distribution system 130 may be split using a splitter 190 so that downstream/upstream bandwidth can pass to/from a television 150 and a modem 140 in accordance with practices well known in the art. The modem 140 may include VOIP capabilities affording telephone 170 services and may include a router affording internet services to a desktop computer 160 and a laptop computer 180, for example.

Additionally, it is common practice to provide a set-top box ("STB") or a set-top unit ("STU") for use directly with the television 150. For the sake of clarity, however, there is no representation of a STB or a STU included in FIG. 2. The STB and STU are mentioned here in light of the fact that many models utilize the upstream bandwidth to transmit information relating to "pay-per-view" purchases, billing, utilization, and other user interactions, all of which may require information to be sent from the STB or STU to the supplier 20. Accordingly, it should be understood that even though FIG. 2 explicitly shows that there is only one upstream bandwidth conditioning device 100 used for one premise device (i.e., the modem 140), each upstream bandwidth conditioning device 100 may be used with two or more premise devices (e.g., a modem, a STB, a STU, and/or a dedicated VOIP server) that transmit desirable upstream information signals via the upstream bandwidth.

The term "premise device" is used throughout to describe any one or more of a variety of devices that generate desirable portions of an upstream bandwidth. More specifically, the term premise device is used to describe devices located on or proximate to a user's premise that either receive the downstream bandwidth, transmit information toward the supplier 20 via the upstream bandwidth, or both. These premise devices include internet access modems, STBs, STUs, televisions, premise security monitoring devices, and any future devices that may have a need to report or otherwise provide information via the upstream bandwidth.

Further, while not shown explicitly in FIG. 2, there may be two (or more) upstream bandwidth conditioning devices 100 located within or proximate to a single premise. For example, there may be an upstream bandwidth conditioning device 100 located between the modem 140 and the splitter 190 and another upstream bandwidth conditioning device 100 located between an STB or STU on the television 150 and the splitter 190. Similarly, there may be an upstream bandwidth conditioning device 100 located at any point in the premise distribution system 130 where an upstream bandwidth is being passed (e.g., from a modem, a STB, a STU, a VOIP server, etc.).

Further, while not shown explicitly in FIG. 2, there may by one upstream bandwidth conditioning device 100 located proximate to two user premises when there is one drop transmission line 120 used to connect the tap 90 to both of the two user premises. Even though such an arrangement is not considered ideal, because the upstream bandwidth from two users may be merged prior to being conditioned, such an arrangement may be necessary when the two premises are located too closely to one another for the physical placement of separate upstream bandwidth conditioning devices 100.

It should be understood that the goal of placing the upstream signal conditioning device 100 into one of the locations described above is to increase the overall quality of the upstream bandwidth in the main distribution system 30 by increasing the signal-to-noise ratio of the upstream bandwidth leaving the user's premise before that particular user's upstream bandwidth is merged with those of other users. As discussed above, merely amplifying the upstream bandwidth fails to achieve the desired result because the undesirable interference signals present in the upstream bandwidth are also amplified.

Figure 3:
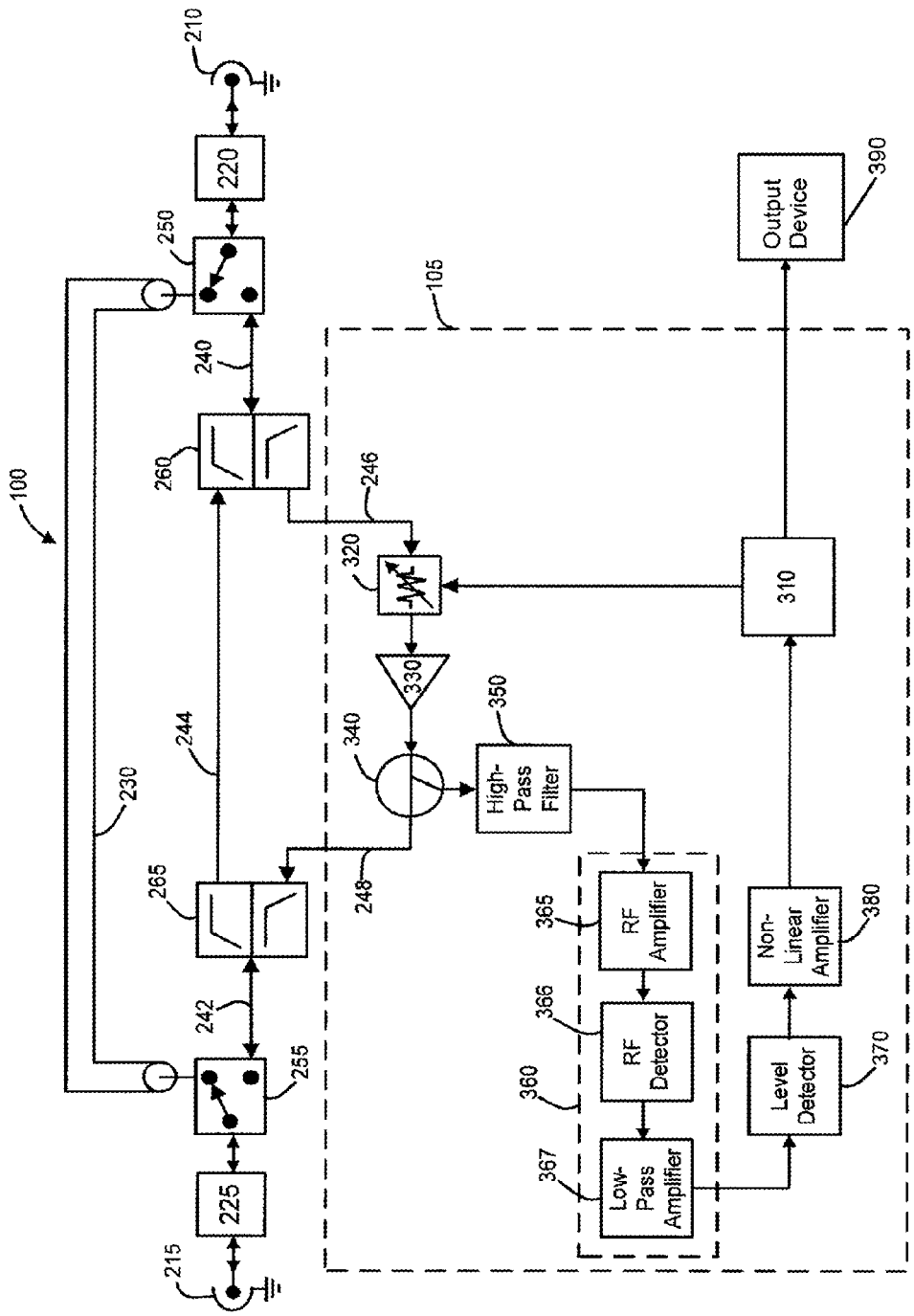
FIG. 3 is a circuit diagram representing a conditioning device including an upstream section made in accordance with another embodiment of the present invention.

Referring now to FIG. 3, the description of the upstream bandwidth conditioning device 100 will be broken down into two general topics of discussion, general components and an upstream bandwidth conditioning section 105 ("upstream section 105"). The general components will be discussed first to develop the terminology used throughout and to help explain how the upstream bandwidth is passed to the upstream section 105. The hardware, the operation, and the control of the upstream section 105 will be discussed thereafter.

Referring still to FIG. 3, the upstream bandwidth conditioning device 100 may include a user side connector 210 and a supplier side connector 215. Each of these connectors 210, 215 may be any of the connectors used in the art for connecting a signal cable to a device. For example, each of the user side connector 210 and the supplier side connector 215 may be a traditional female "F-type" connector.

A user side surge protector 220 and a supplier side surge protector 225 may be provided electrically adjacent the user side connector 210 and the supplier side connector 215, respectively. This positioning of the surge protectors 220, 225 allows for the protection of electrically fragile components (discussed more fully below) positioned between the surge protectors 220, 225. Each of the user side surge protector 220 and the supplier side surge protector 225 may be any of the surge protectors known in the art for electronic applications.

A user side switch 250 and a supplier side switch 255 each have two positions. In a first, default position (shown in FIG. 3), the switches 250, 255 pass signals through a bypass path 230. In a second position, the user side switch 250 and the supplier side switch 255 electrically connect the user side connector 210 to a user side main path 240 and the supplier side connector 215 to the a supplier side main path 242, respectively. As will be discussed further below, the primary components of the upstream bandwidth conditioning device 100 are electrically connected in series between the user side main path 240 and the supplier side main path 242.

The switches 250, 255 allow the total bandwidth to pass through the bypass path 230 in the event of a fault within the upstream bandwidth conditioning device 100, such as an electrical power failure. The switches 250, 255 may be any of the SPDT (Single Pole Double Throw) switches known in the art. For example the switches 250, 255 may be selected and installed such that when there is no electrical power present to the upstream bandwidth conditioning device 100, the switches 250, 255 automatically select the first, default position to pass the total bandwidth through the bypass path 230. Conversely, when there is electrical power present, the switches 250, 255 move toward their second position passing the total bandwidth to the main paths 240, 242. In the event of an electrical short within the upstream bandwidth conditioning device 100, it is likely that the short will cause an additional current flow that will ultimately result in the destruction of a fuse or in an opening of a circuit breaker type device (not shown). Accordingly, such a short will likely result in a loss of power to switches allowing the total bandwidth to pass through the bypass path 230.

A microprocessor 310 (discussed more fully below) may also be used to actuate the switches 250, 255 to their first position (i.e., to the bypass path 230) when a fault, other than an electrical power loss, is detected within the upstream bandwidth conditioning device 100. While the circuitry for such a connection is not shown in FIG. 3, it should be understood that the control by the microprocessor 310 should be in addition to the switches 250, 255 automatic positioning due to an electrical failure.

The term "microprocessor" used throughout should be understood to include all active circuits capable of performing the functions discussed herein. For example, the microprocessor 310 may be replaced with a microcontroller, a system specific digital controller, or a complex analog circuit.

The bypass path 230 may be a coaxial cable, an unshielded wire, and/or a metallic trace on a circuit board. All of these options are capable of passing the total bandwidth with little signal attenuation.

A user side diplexer 260 and a supplier side diplexer 265 are electrically coupled to the user side main path 240 and the supplier side main path 242, respectfully. The diplexers 260, 265 are arranged and configured to create a forward path 244 and a return path 246, 248 there between. Each of the diplexers 260, 265 may function like a combination of a splitter, a high-pass filter, and a low-pass filter, the splitter dividing the respective main path 240, 242 into two signal paths, one for each of the low-pass filter and the high-pass filter. Using the terms of this combination, each of the high-pass filters passes the downstream bandwidth, and each of the low-pass filters passes the upstream bandwidth. In the present example, the downstream bandwidth passes along the forward path 244 between the diplexers 260, 265. Of particular importance to the present upstream bandwidth conditioning device 100, the upstream bandwidth passes along the return path 246, 248 between the diplexers 260, 265. The remainder of the description below focuses on the hardware, the operation, and the control of the upstream section 105 attached within the return path 246, 248.

In an effort to set the stage for the following discussion, the hardware, the operation, and the control of the upstream section 105 will be first described here in very general detail. The upstream section 105 selectively attenuates the upstream bandwidth in increments with the knowledge that a typical premise device will increase the power with which it transmits its portion of the upstream bandwidth (i.e., the desirable upstream bandwidth) to account for the added attenuation. The result is that the desirable upstream bandwidth will be larger in percentage than the remaining portions (i.e., the undesirable upstream bandwidth). To accomplish these goals, the upstream section 105 must be able to precisely measure the level of the desirable upstream bandwidth in order to increase the amount of attenuation without adding more attenuation than the premise device can account for in terms of increasing its output power. Precise measurements of the desirable upstream bandwidth level are difficult, if not impossible, to make using only traditional level detectors.

The desirable upstream bandwidth is difficult to measure due to the inherent functional characteristics of premise devices. For example, a premise device typically transmits a desirable upstream bandwidth only when that premise device is being requested to transmit information. For example, a premise device, such as an internet access modem, typically transmits information only when a user sends information to the internet. Because there is no way to anticipate when such information is to be sent, the desirable upstream bandwidth created by the premise device must be assumed to be time independent and time discontinuous. Further, the continuity of the information that is being transmitted varies greatly, such as between a simple Pay-Per-View purchase request and an Internet upload of a large, detailed photograph. In other words, the portion of the upstream bandwidth created by a premise device may occur at any time and may occur for any length of time. The upstream section 105 includes features that are used specifically to identify this time independent and time discontinuous desirable upstream bandwidth.

Figure 4:
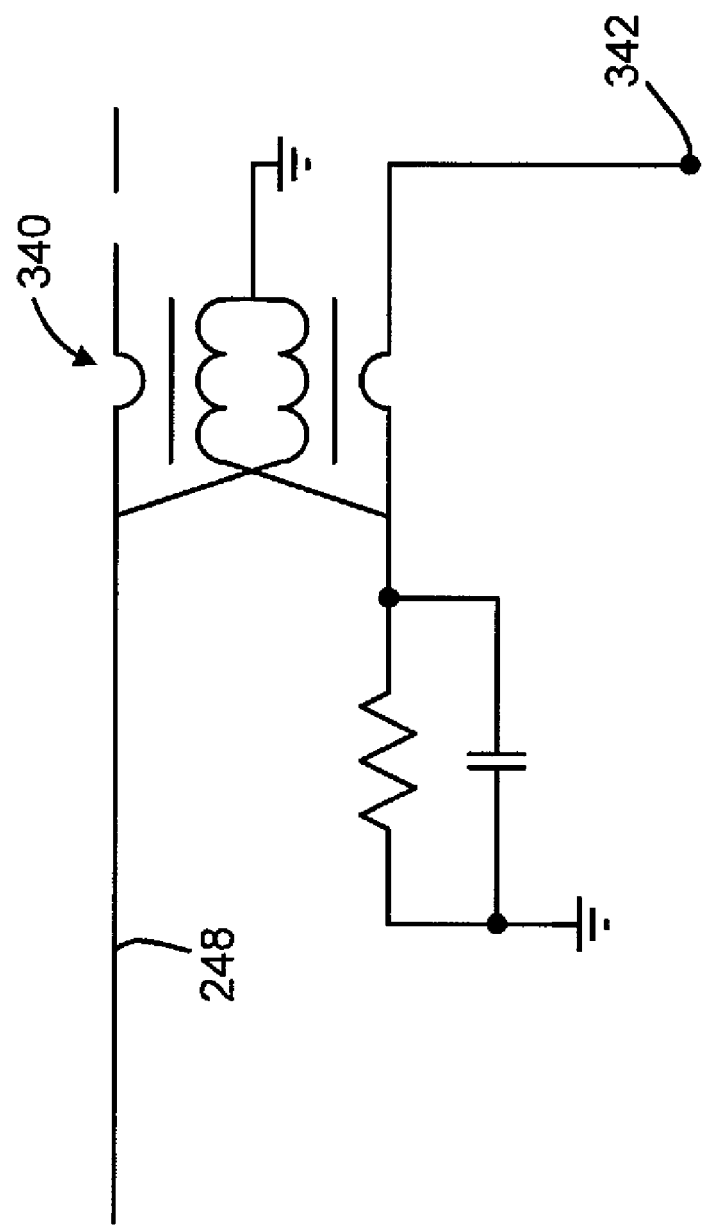
FIG. 4 is a circuit diagram representing a coupler used in a conditioning device made in accordance with one embodiment of the present invention.

The upstream section 105 includes a coupler 340 connected within the return path 246, 248 to pass a portion of the upstream bandwidth, in terms of power and/or frequency range, to subsequent devices in the upstream section 105 via secondary path proceeding from a coupler output 342 (FIG. 4). One skilled in the art would readily understand, based on the present description and the size requirements of a particular installation, which type of coupler would be suitable for the present purpose. For example, a simple resistor, a power divider, a directional coupler, and/or a splitter may be used with careful consideration of the effects that these alternatives may have on the characteristic impedance of the upstream bandwidth conditioning device 100. Individual components present in one embodiment of the coupler 340 are represented in FIG. 4.

The term "connected" is used throughout to mean optically or electrically positioned such that current, voltages, and/or light are passed between the connected components. It should be understood that the term "connected" does not exclude the possibility of intervening components or devices between the connected components. For example, the coupler 340 is connected to a RF amplifier 365 even though a high pass filter 350 is shown to be positioned in an intervening relation between the coupler 340 and the RF amplifier.

The terms "connected electrically downstream" and "connected electrically upstream" may also be used throughout to aid in the description regarding where or how the two components are connected. As an example, when a second device is connected electrically downstream from a first device, the second device receives signal from the first device. This same arrangement could also be described as having the first device connected electrically upstream from the second device.

Figure 5:
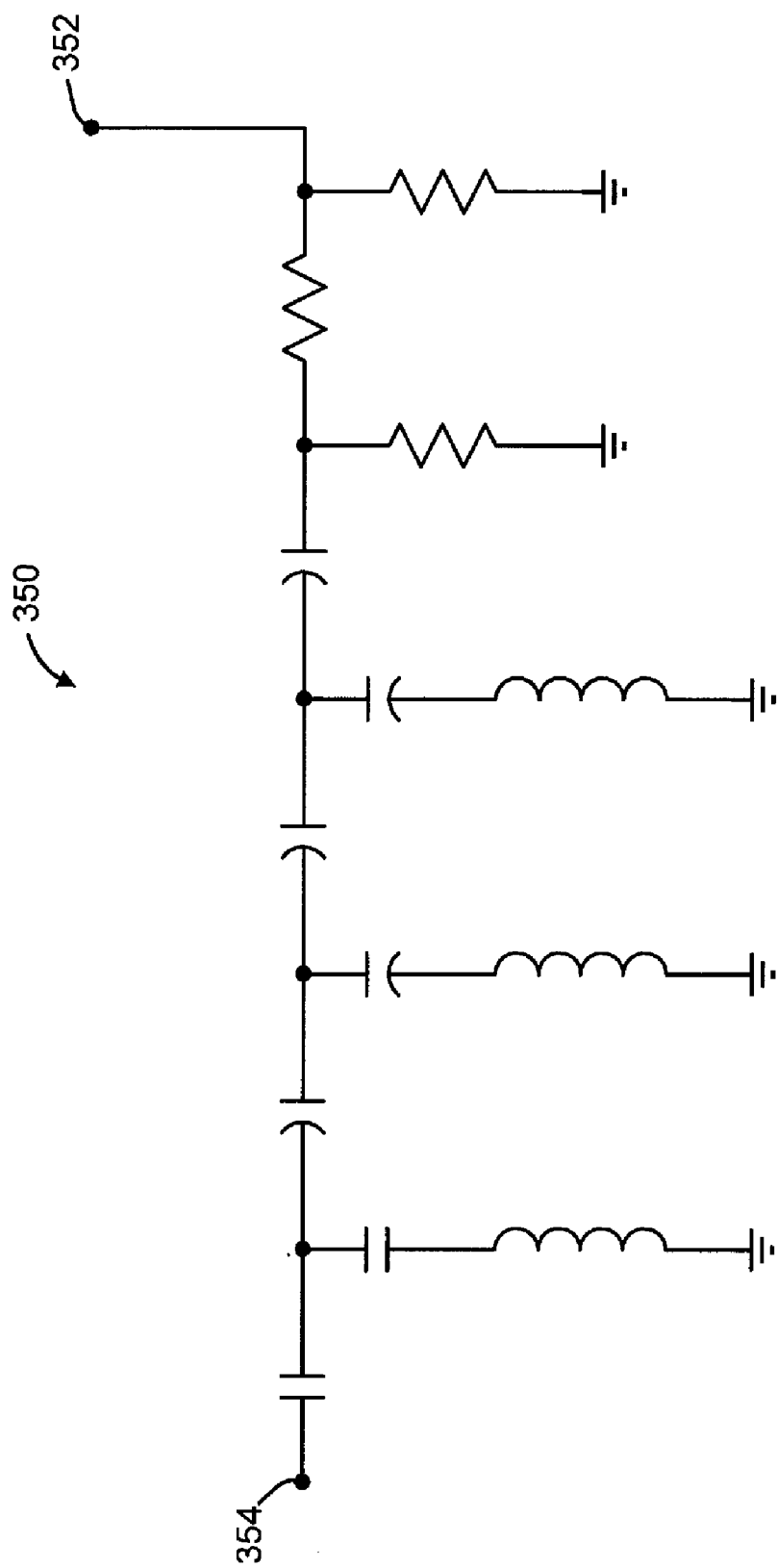
FIG. 5 is a circuit diagram representing a high pass filter used in a conditioning device made in accordance with one embodiment of the present invention.

Referring back to FIG. 3, the high-pass filter 350 is connected electrically downstream from the coupler 340 such that the coupler output 342 is electrically connected to a high-pass filter input 352 (FIG. 5). The high-pass filter 350 is utilized in this instance to pass only a segment of the upstream bandwidth through to the remaining devices, discussed below, via a high-pass filter output 354 (FIG. 5). Such a high-pass filter 350 may not be required in all instances, but may be beneficial in that it attenuates segments of the upstream bandwidth that are known not to carry the desirable upstream bandwidth. For example, if the premise devices are known to provide their desirable upstream bandwidth in a specific segment of the upstream bandwidth, it may be beneficial to configure the high-pass filter 350 to attenuate segments of the upstream bandwidth below the specific segment of the upstream bandwidth where the premise device transmits. One skilled in the art would readily understand, based on the present description and the size requirements of a particular installation, which type of high-pass filter would be suitable for the present purpose. Individual components present in one embodiment of the high-pass filter 350 are represented in FIG. 5.

Figure 6:
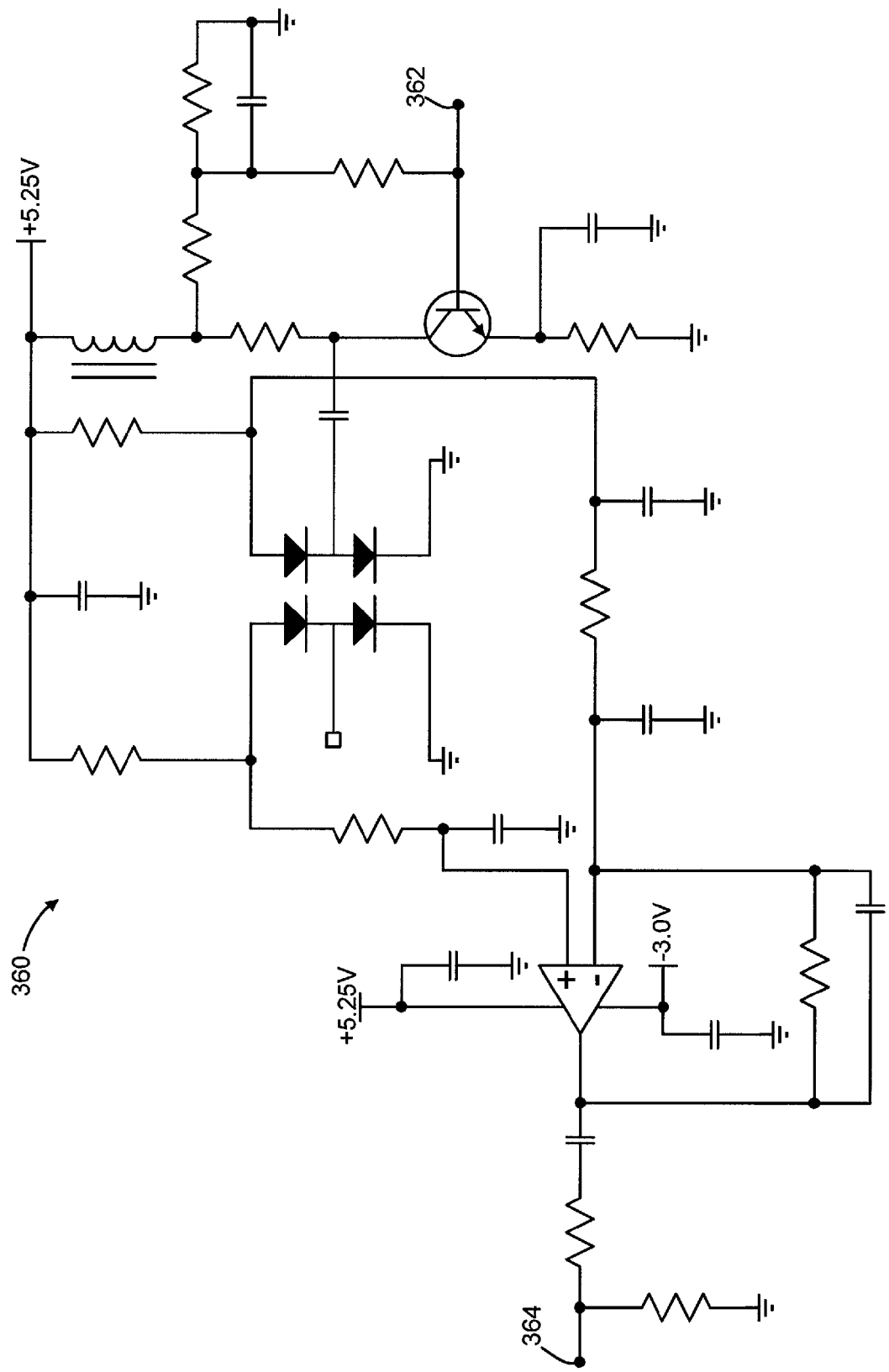
FIG. 6 is a circuit diagram representing a RF detection circuit used in a conditioning device made in accordance with one embodiment of the present invention.

A RF detection circuit 360 is connected electrically downstream from the high-pass filter 350 such that the high-pass filter output 354 is electrically connected to a RF detector input 362 (FIG. 6). The RF detection circuit 360 includes a RF amplifier 365 a RF detector 366 and a low-pass amplifier 367. The RF amplifier 365 amplifies the portion of the downstream bandwidth passed through the high-pass filter 350 in preparation for the RF detector 366. The RF detector 366 functions as an inverse Laplace transform, the Laplace transform being a widely used integral transform, to convert the portion of the downstream bandwidth from a frequency domain voltage stream into a time domain voltage stream. The inverse Laplace transform is given the following complex integral, which is known by various names, the Bromwich integral, the Fourier-Mellin integral, and Mellin's inversion formula. An alternative formula for the inverse Laplace transform is given by Post's inversion formula. The time domain voltage stream is then passed to the low-pass amplifier 367, which amplifies the voltages while discriminating in the time between those having suitable signal duration and those that are too short for usage within the following circuitry stages.

Figure 8:
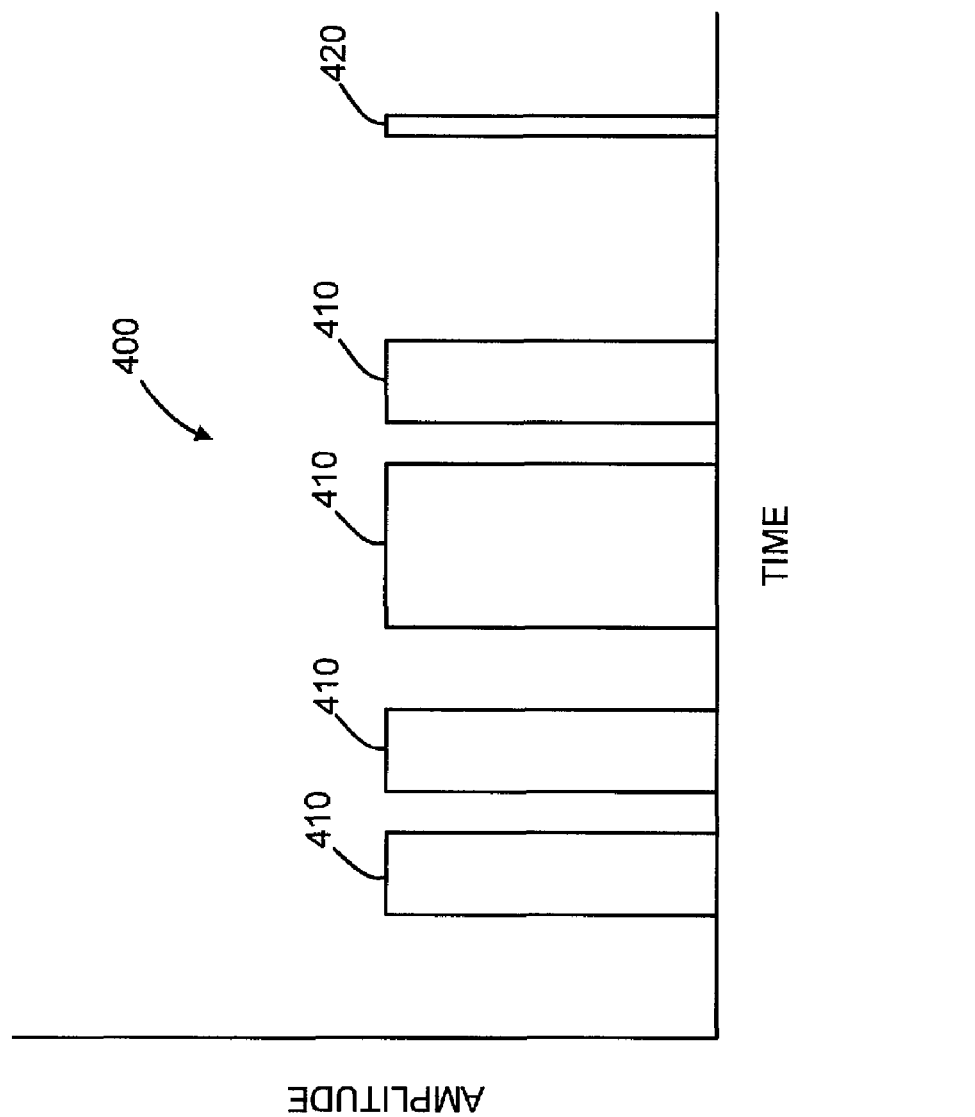
FIG. 8 is a graphical representation of a voltage stream passing from a RF detector to a low-pass amplifier within a RF detection circuit used in a conditioning device made in accordance with one embodiment of the present invention.

As an example, FIG. 8 represents a time domain voltage stream output 400 from the RF detector 366 to the low-pass amplifier 367. The time domain voltage stream 400 includes increased voltage levels 410 and 420 that last for varying amounts of time. Longer sections of increased voltage 410 typically represent significant information being sent by a premise device, while shorter sections of increased voltage 420 typically represent "pings," which are very short bursts of little information. These longer sections of increased voltage have a period that may be typical for a particular premise device. In other words, the longer sections of increased voltages 410 may have shorter or longer sections of lower voltage between the longer sections of increased voltages 410. This period, which may change based on the types of premise devices present, will be important when discussing a level detector 370.

Figure 9:
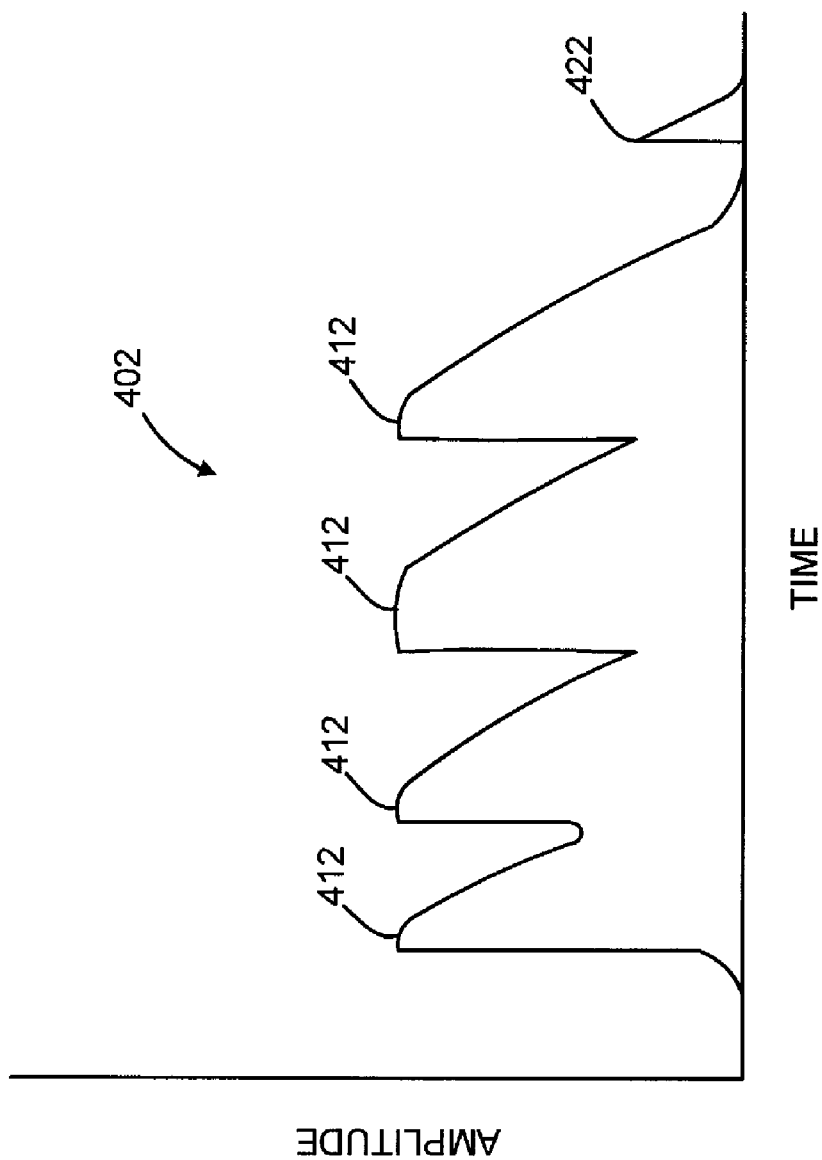
FIG. 9 is a graphical representation of a voltage stream passing from a low-pass amplifier within a RF detection circuit to a level detector used in a conditioning device made in accordance with one embodiment of the present invention.

Referring now to FIG. 9, the low-pass amplifier 367 creates a voltage stream 402 where the longer periods of increased voltage 410 (FIG. 8) result in higher voltages 412 and where the shorter periods of increased voltage 420 (FIG. 8) result in lower voltages 422. This voltage stream 402 is then output to the level detector 370 from a RF detection circuit output 364. One skilled in the art would readily understand, based on the present description and the size requirements of a particular installation, which type of components should be used to create the RF detection circuit 360. Individual components present in one embodiment of the RF detection circuit 360 are represented in FIG. 6.

Figure 7:
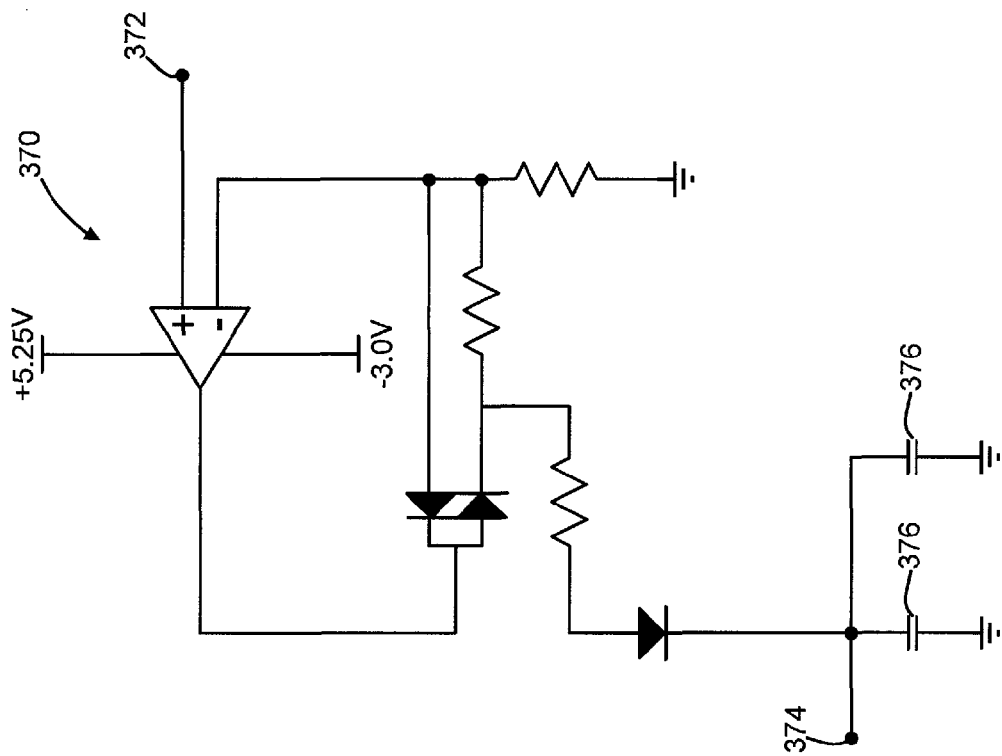
FIG. 7 is a circuit diagram representing a level detector used in a conditioning device made in accordance with one embodiment of the present invention.

The level detector 370 is connected electrically downstream from the RF detection circuit 360 such that the output of the RF detection circuit is electrically connected to a level detector input 372 (FIG. 7). The level detector 370 generates additional current based on the voltage stream provided by the RF detection circuit 360, and the level detector 370 includes at least one diode and at least one relatively large capacitor 376 to store the current provided. A voltage stream 404 (FIG. 10) provided from the large capacitor 376 to the level detector output 374 is relative to the voltage stream 402 provided by the RF detection circuit 360 at the level detector input 372, except that any increased voltage 412, 422 is held for a duration longer than that of the voltage stream 402 from the RF detection circuit 360. The amount of duration that any increased voltage is held is strictly a factor of the sizing of the at least one capacitor, the sizing of an associated resistor, and the current drawn by subsequent devices.

Figure 10:
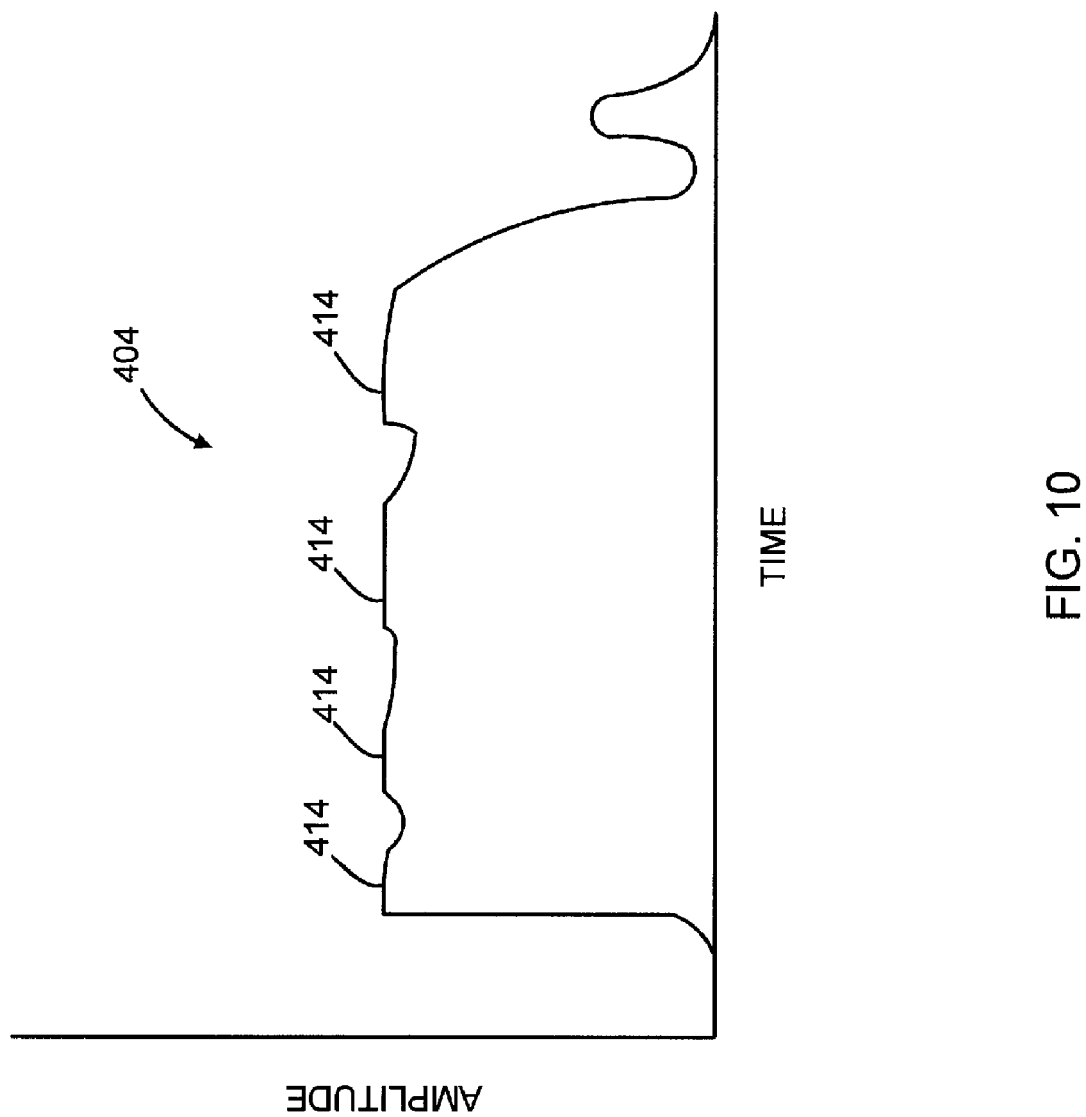
FIG. 10 is a graphical representation of a voltage stream passing from a level detector to a non-linear amplifier used in a conditioning device made in accordance with one embodiment of the present invention.

Referring now to FIG. 10, the level detector 370 creates the voltage stream 404 where the longer periods of increased voltage 412 (FIG. 9) are more consistent such that there is less voltage decline between the resulting longer periods of increased voltage 414. This voltage stream 404 is then output to a non-linear amplifier 380 from a level detector output 374.

Individual components present in one embodiment of the level detector 370 are represented in FIG. 7. While most of the components are self explanatory to one skilled in the art, it is notable that the level detector 370 made in accordance with one embodiment includes two 10 µF capacitors 376 sufficient to hold a voltage for up to six seconds. This amount of time has been found to be sufficient to join message voltages 412 (FIG. 9) in the voltage stream 402 (FIG. 9) for the measurements made by the microprocessor 310, discussed more fully below. The amount of time duration may be less or more depending on the congruity of the messages typically being sent and the speed of the processor 310.

More generally speaking, the duration needed for the present embodiment is approximately ten times the period of the longer sections of increased voltage 410 provided by the premise device. Accordingly, the duration may change depending on the premise devices present. Further, it should be understood that the term approximately is used here in relation to the "ten times" multiplier because less than ten times may work well enough if a low voltage threshold ("VIL") is reduced accordingly to allow for greater voltage drops between the longer sections of increased voltage 410. More than ten times may result in a duration that is too long, where the voltage may not drop soon enough past the VIL to properly stop a series. These statements will be understood once the VIL and its effect on a series are discussed more fully below. As would be understood by one skilled in the art based on the present description, the amount of capacitance desired for a particular amount of duration may be accomplished by one large capacitor or a plurality of smaller capacitors.

Figure 11:
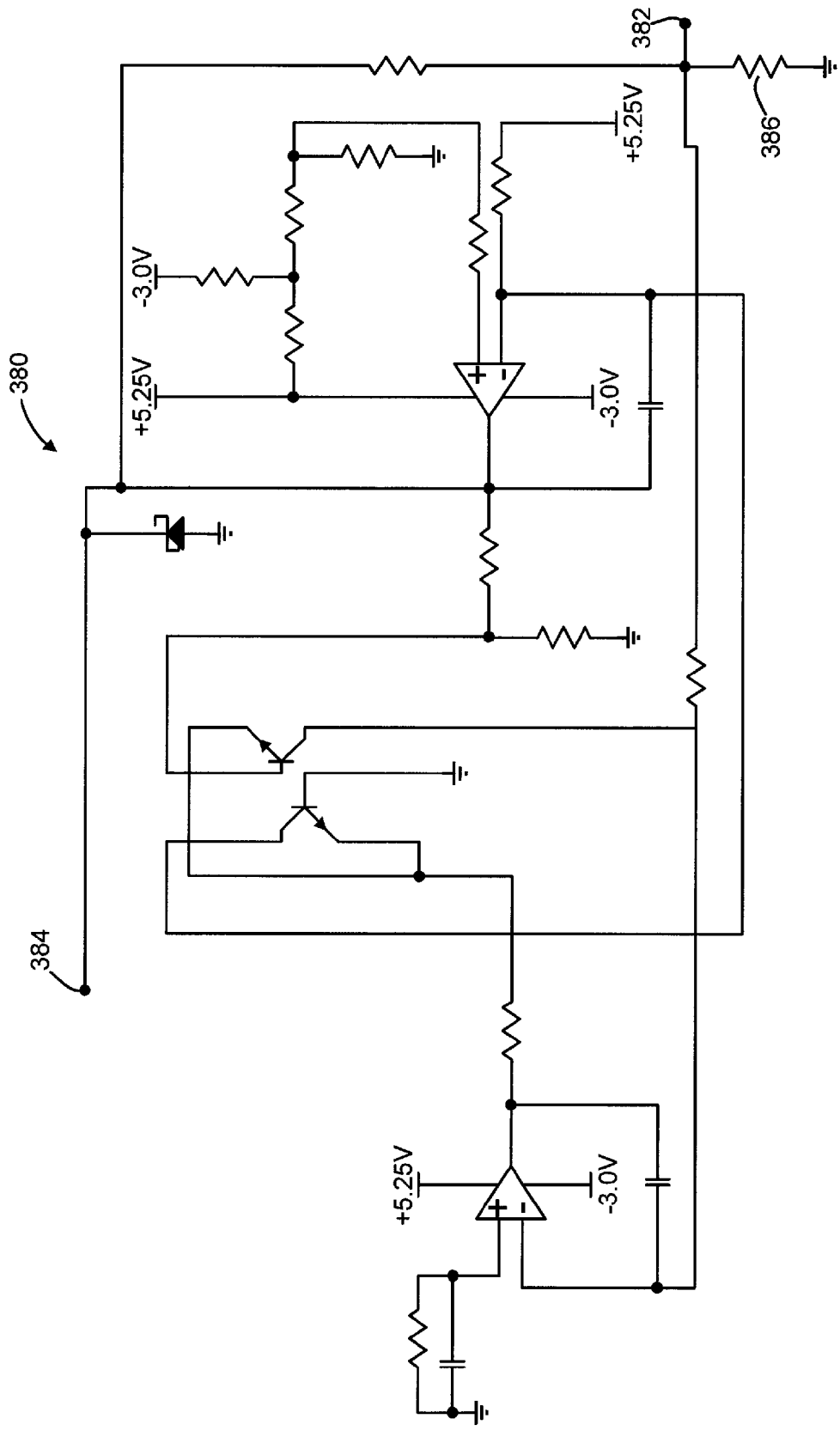
FIG. 11 is a circuit diagram of a non-linear amplifier used in a conditioning device made in accordance with one embodiment of the present invention.

Referring back to FIG. 3, the non-linear amplifier 380 is connected electrically downstream from the level detector 370 such that the level detector output 374 is electrically connected to a non-linear amplifier input 382 (FIG. 11). The non-linear amplifier 380 compresses the voltage stream 404 provided by the level detector 370 to provide additional resolution to lower voltages. Specifically, the non-linear amplifier 380 provides additional detail to lower voltages without unnecessarily providing additional resolution to higher voltages. This is important in the present embodiment of the upstream bandwidth conditioning device because the microprocessor 310 accepts a voltage stream from the non-linear amplifier 380 at the non-linear amplifier output 384 (FIG. 11) and converts it to a digital value in the range of 0-255. Additional resolution applied to the entire voltage stream from the level detector 370 would require more than 255 digital values, and a linear resolution of the voltage stream from the level detector 370 may result in poor quality measurements of the upstream bandwidth. Individual components present in one embodiment of the non-linear amplifier 380 are represented in FIG. 11.

The non-linear amplifier 380 is shown in FIG. 11 to include a resistor 386 positioned near the non-linear amplifier input 382. This resistor 386 allows for the voltage stream 404 from the level detector 370 to bleed off rather than to maintain a particular voltage indefinitely. Accordingly, it should be understood that this resistor 386 may be considered to be a part of either the level detector 370 or the non-linear amplifier 380.

Figure 12:
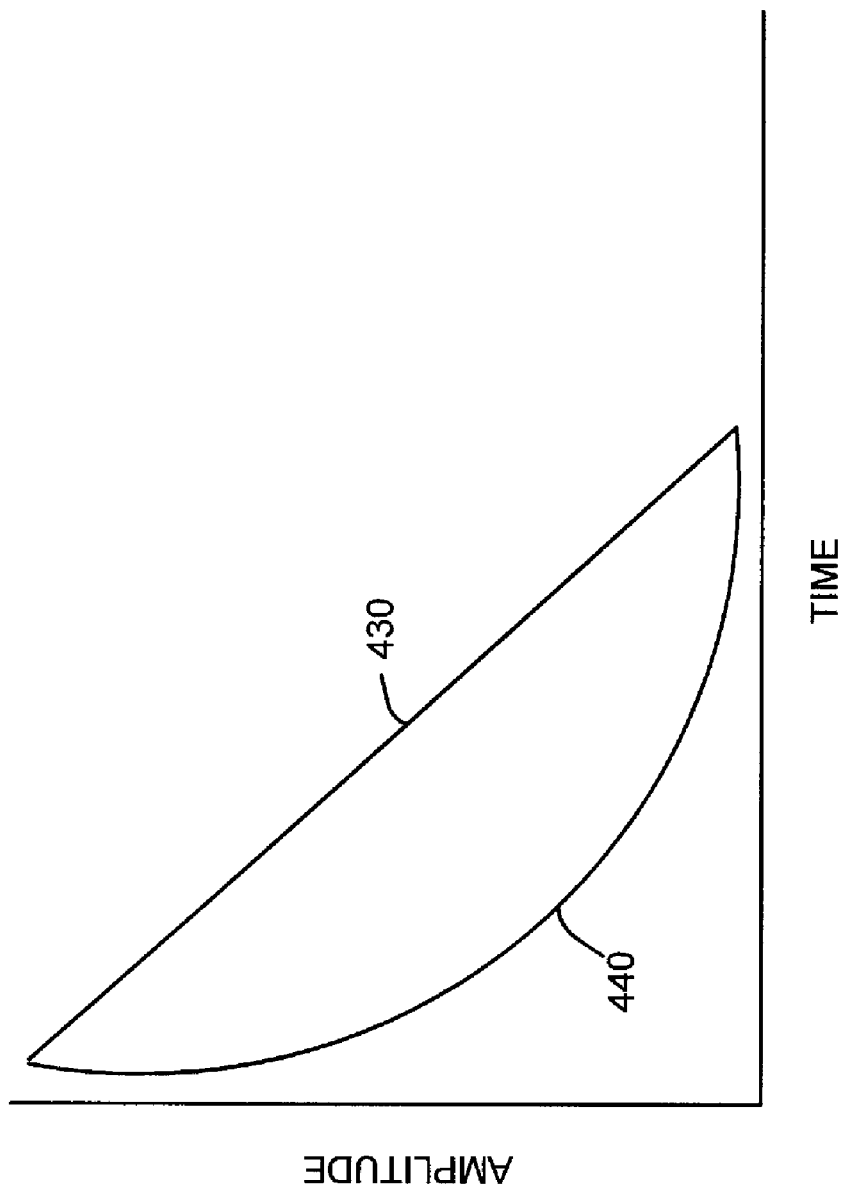
FIG. 12 is a graphical representation of a theoretical response of a non-linear amplifier in response to a linearly increasing voltage.

An example of a linearly changing input voltage stream 430 along with a non-linearly changing output voltage stream 440 can be seen in FIG. 12. As shown, at relatively low input voltage levels, the output voltage stream 440 changes significantly more in relation to any changes in the input voltage stream 430. However, at relatively high voltage levels, the output voltage stream 440 changes significantly less in relation to any changes in the input voltage stream 430.

Figure 13:
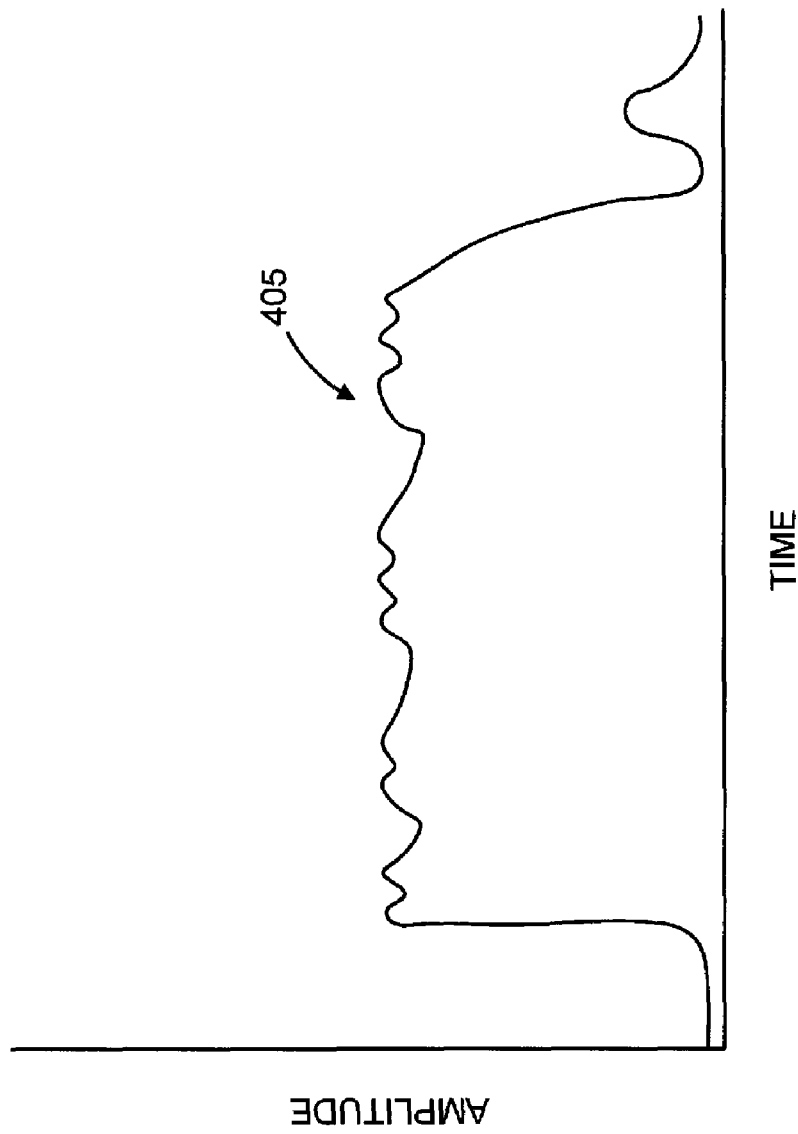
FIG. 13 is a graphical representation of a voltage stream passing from a non-linear amplifier to a microprocessor used in a conditioning device made in accordance with one embodiment of the present invention.

FIG. 13, represents an exemplary output voltage stream 405 produced in response to the voltage stream 404 represented in FIG. 10. As shown, the effect of the non-linear amplifier 380 is to emphasize details present in the lower voltages while deemphasizing the higher voltages. As mentioned above, this effect of the non-linear amplifier 380 helps provide additional resolution to the lower voltages for measurement purposes.

Referring again to FIG. 3, the microprocessor 310 may be electrically connected downstream from the non-linear amplifier 380 such that the microprocessor 310 is connected to the non-linear amplifier output 384. The microprocessor 310 measures the individual voltages from the non-linear amplifier 380 and may convert these voltages into a digital scale of 0-255. It should be understood that the present scale of 0-255 was chosen in the present embodiment only because of the capabilities of the microprocessor 310. Many other scales, including an actual voltage measurement may also function depending on the capabilities of the microprocessor 310. Because of these possible differences in measurement value scales, the term "level value" will be used throughout to describe the value assigned to a particular voltage input to the microprocessor 310 for further processing.

Figure 14:
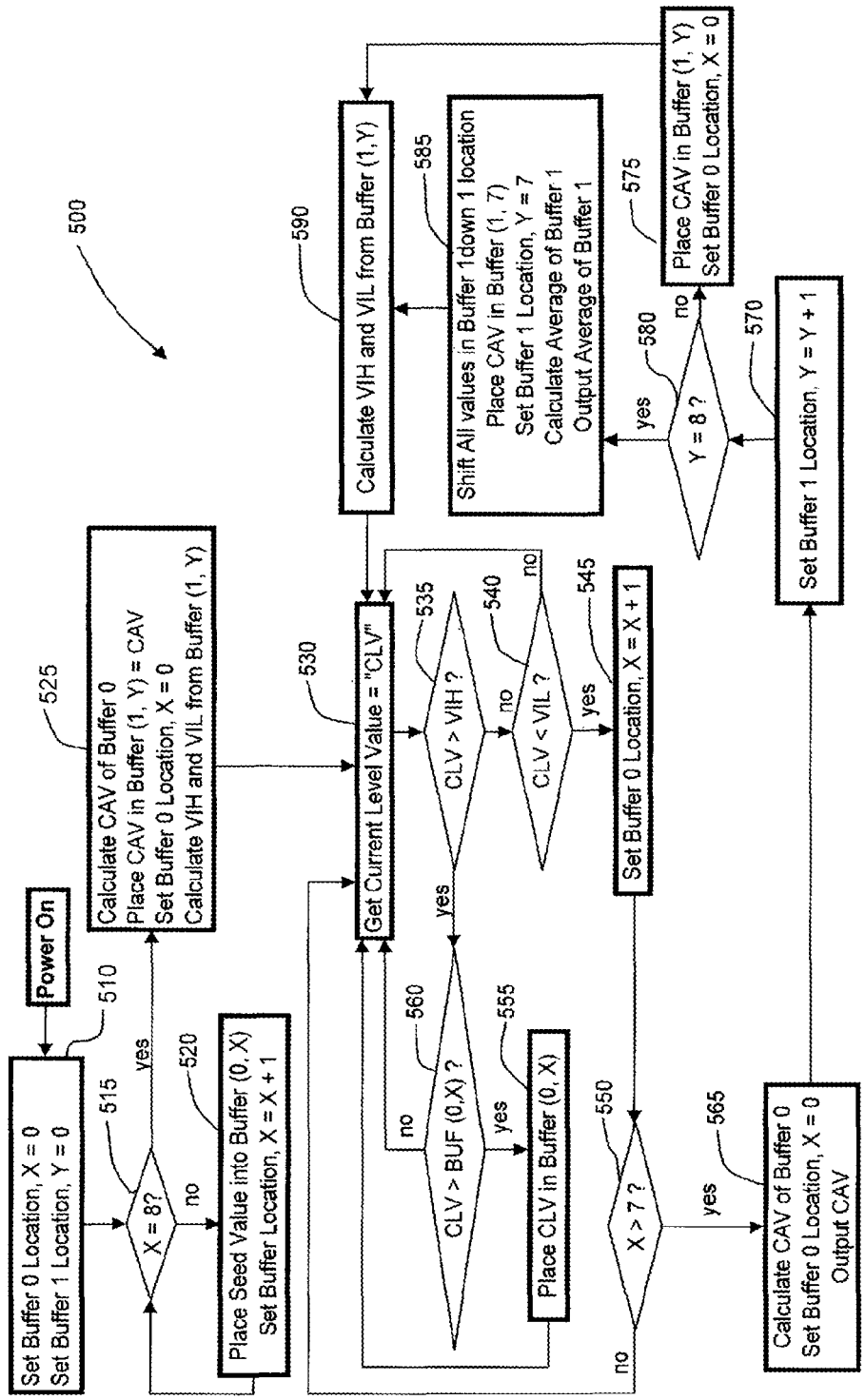
FIG. 14 is a flow chart representing a signal level measurement routine performed by a microprocessor used in a conditioning device made in accordance with one embodiment of the present invention.

Referring now to FIG. 14, the microprocessor 310 works through a series of process steps 500 to determine a level value of the desirable upstream bandwidth generated by a premise device. These level values will be provided to a to an output device 390 (FIG. 3) to be reviewed by a technician for the purpose of conditioning the upstream bandwidth. The output device 390 may be any one or more of a monitor, a memory device, a network monitoring location, a hand held device, and a printer. The level values provided by the process steps 500 are a short term average and a long term average.

The short term average is an average of a Buffer Ø, the Buffer Ø having eight input locations (Ø-7). In the process 500, the Buffer Ø input locations, may be referred to in two separate manners. First, the Buffer Ø input locations may be referred to specifically as Buffer (Ø, Ø), Buffer (Ø, 1), Buffer (Ø, 2), Buffer (Ø, 3), Buffer (Ø, 4), Buffer (Ø, 5), Buffer (Ø, 6), and Buffer (Ø, 7). Second, the Buffer Ø input locations may be referred to as Buffer (Ø, X), where X is a variable that is increased and reset as part of the process 500. The average of the Buffer Ø input locations is referred to herein as the current average value ("CAV"). Accordingly, the short term average that is output for review by a technician is the CAV.

The long term average is an average of a Buffer 1, the Buffer 1 having eight input locations (Ø-7). In the process 500, the Buffer 1 input locations may be referred to specifically as Buffer (1, Ø), Buffer (1, 1), Buffer (1, 2), Buffer (1, 3), Buffer (1, 4), Buffer (1, 5), and Buffer (1, 6) and Buffer (1, 7). Further, the Buffer 1 Input Location may be referred to as Buffer (Ø, Y), where Y is a variable that is increased, decreased, and reset as part of the process 500.

Each of the Buffer Ø and the Buffer 1 may include more or less than eight input locations. While it has been found that eight input location works well for the intended purpose of obtaining a level of the upstream bandwidth, more input locations may provide a smoother level value with less volatility. The additional input locations come at a cost of additional time to obtain a level measurement and additional processor consumption.

Upon a powering on of the upstream bandwidth conditioning device 100, the microprocessor 310 performs an initialization routine, which includes steps 510, 515, 520, and 525. According to step 510, the Buffer Ø input location X is set to Ø and the Buffer 1 input location Y is set to Ø. Afterward, the process 500 moves to step 515.

According to step 515, the microprocessor 310 checks to see whether the Buffer Ø input location X is equal to 8. The purpose of step 515 is to determine whether Buffer Ø is full. The value of 8 is used, because X is incremented by one after a seed value (discussed below) is placed in the last buffer location (i.e. Buffer (Ø, 7)). Accordingly, even though there is no location "8," the value of eight is relevant to the present determination. It should be understood that a value of "7" could also be used if the step of incrementing the value of "X" occurs at a different location in the process 500. If the answer to step 515 is "no," the microprocessor moves to step 520. Otherwise, the microprocessor 310 moves to step 525.

According to step 520, the microprocessor 310 places a seed value into Buffer (Ø, X), which in the first instance is Buffer (Ø, Ø). The seed value is an empirically derived value that is relatively close to the level value anticipated to be found. In other words, the seed value in the present embodiment is experimentally determined based on actual values observed in a particular CATV system. The seed value needs to be relatively close to the initial level value of the upstream bandwidth to allow the upstream bandwidth conditioning device to start the stabilization process. After filling Buffer (Ø, X) with the seed value, the microprocessor returns to step 515 to check whether Buffer Ø is full. This process between steps 515 and 520 continues to fill all of the Buffer Ø input locations with the seed value. Once full, the microprocessor moves to step 525.

According to step 525, the microprocessor 310 is to obtain a CAV of the Buffer Ø, and place that value in Buffer (1, Y), which in this first instance is Buffer (1, Ø). The microprocessor resets the Buffer Ø input location X to Ø, but leaves the seed values in the Buffer Ø input locations. One skilled in the art would understand that the present process will function normally if the values in Buffer Ø are erased or left as is to be written over at a later time.

Further in accordance with step 525, a high voltage limit ("VIH") and a low voltage limit ("VIL") are calculated based on the CAV value placed into Buffer (1, Y), which is currently Buffer (1, Ø). Note that this could also be worded as calculating VIH and VIL based on the CAV. Regardless, VIH and VIL are calculated values that are used in later steps to exclude a vast majority of level values that are not near the expected level values. This exclusion helps to make the present upstream bandwidth conditioning device 100 more stable by avoiding mistaken peak value measurements that are far below the expected values. Because both VIH and VIL are determined after every new CAV is determined, VIH and VIL are allowed to float in the event of a large change in the level values received. In the present instance, VIH is to be approximately 94% of the Buffer (1, Y), and VIL is to be approximately 81% of the Buffer (1, Y). Both VIH and VIL may be other ratios that allow for more or less level values to be included in any peak value determination. The peak value determination will be discussed further below, but it may be helpful to explain here that VIH sets a high initial threshold where level values below VIH are excluded from consideration. Similarly, VIL is a low secondary threshold where level values are considered until a level value of a particular series (a series starting when a level value exceeds VIH) is below VIL. In other words, a series of level values will be examined for a single peak value, the series beginning with a level value exceeding VIH and ending with a level value falling below VIL. Because the most recent CAV is the seed value of 51, VIH is calculated to be 48 and VIL is calculated to be 41. These values will, of course, change as the CAV changes after actual level values are obtained. After completion of the present step, the microprocessor moves to step 530.

In accordance with step 530, the microprocessor 310 obtains a current level value ("CLV"). The CLV is the value of the voltage provided by the non-linear amplifier 380 (FIG. 3) at the current time. Once a CLV is obtained, the microprocessor proceeds to step 535.

According to step 535, the microprocessor 310 looks to see whether the recently obtained CLV is greater than VIH to start considering a series of level values. As mentioned above, if the particular CLV is the first obtained value (since having a value fall below VIL) that is greater than VIH, it is the first of a series. Once a series is started, it will continue until a level value is obtained that is less than VIL. Accordingly, if the CLV is below VIH, the microprocessor 310 proceeds to step 540 to determine whether CLV is less than VIL, which if true would stop the series. If the CLV is greater than VIH, the next step is step 560.

According to step 540, the microprocessor 310 looks to see whether the recently obtained CLV is less than VIL. As mentioned above, all of the level values obtained that fall below VIL are eliminated from consideration. Rather, than proceeding directly back to step 530 for a new CLV, the process 500 moves to step 545 when the CLV is less than VIL. Accordingly, if the CLV is greater than VIL, the next step is back to step 530 to obtain a new CLV. To continue the series started by having a CLV greater than VIH. It should be understood that any of these comparisons to VIH and VIL may be equal to or less/greater than instead of merely less/greater than. The additional values used or not used would not significantly alter the result.

Once the microprocessor 310 proceeds through step 545 a sufficient number of times incrementing the Buffer Ø input location X, step 550 will be satisfied indicating that the Buffer Ø is ready to be averaged. Accordingly, the microprocessor 310 moves to step 565.

In accordance with step 565, the microprocessor 310 calculates a CAV, which is the average of Buffer Ø and sets the Buffer Ø input location X to Ø. Also at step 565, the microprocessor 310 outputs the CAV to one of the devices mentioned above for review and consideration by a technician for the purpose of conditioning the upstream bandwidth. The microprocessor 310 then proceeds to step 570.

In accordance with step 570, the microprocessor 310 increments the Buffer 1 input location by one. After which, the microprocessor 310 determines whether the Buffer 1 input locations are full in step 580. Because there are only eight input locations in Buffer 1, (Ø-7) a value of 8 would indicate that the Buffer 1 is full. The reason for this will become evident below. If the Buffer 1 is full, the next step is step 585. Otherwise, the next is step 575.

In accordance with step 575, the CAV is placed in the next open Buffer 1 input location, Buffer (1, Y). The process then proceeds to step 590.

If the Buffer 1 were full, the microprocessor 310 would have proceeded to step 585 instead of step 575. In accordance with step 585, all of the values currently in Buffer 1 are shifted down 1 location such that the value originally (i.e., before step 585) in Buffer (1, Ø) is removed from Buffer 1. The CAV is then placed in Buffer (1, 7). Further, an average of Buffer 1 is calculated and output to one of the devices mentioned above for review and consideration by a technician for the purpose of conditioning the upstream bandwidth. Further in step 585, the Buffer 1 input location Y is set to 7. As with step 575, the process proceeds to step 590.

In accordance with 590, the microprocessor 310 calculates new values for VIH and VIL from Buffer (1, Y), which may be Buffer (1, 7) if step 585 was previously accomplished. After step 590, the process 500 returns to step 530 to obtain a new CLV and the relevant portions of process 500 are reiterated.

This process 500 continues throughout the operation of the upstream bandwidth conditioning device 100. At any time, the microprocessor 310 may output the current CAV and/or average of Buffer 1 to the output device 390. Additionally and in accordance with one embodiment of the present invention, these values may be stored in memory locations either within the microprocessor 310, or in another circuit for later retrieval and analysis.

While the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

The invention claimed is:

1. A measurement device for measuring an upstream bandwidth, the device comprising: a return path extending at least a portion of a distance between a supplier side connector and a user side connector;
   a coupler connected within the return path, the coupler providing a secondary path;
   a detection circuit connected electrically downstream the coupler;
   a level detector connected electrically downstream the detection circuit; and a microprocessor connected electrically downstream the level detector, the microprocessor comprising a first buffer and a second buffer, wherein the first buffer is a series peak buffer comprising values relative to a voltage output of the level detector, and the second buffer is an average buffer comprising at least one average of the values placed in the series peak buffer.

2. The measurement device of claim 1, further comprising a non-linear amplifier connected electrically downstream the level detector and electrically upstream the microprocessor.

3. The measurement device of claim 2, wherein the non-linear amplifier provides relatively less amplification to higher voltages from a voltage stream of the level detector than to lower voltages from the voltage stream of the level detector.

4. The measurement device of claim 1, further comprising a high-pass filter connected electrically between the coupler and the detection circuit.

5. The measurement device of claim 1, wherein the detection circuit comprises an amplifier and a detector, the detector translating a frequency dependent voltage stream into a first time dependent voltage stream.

6. The measurement device of claim 5, wherein the detection circuit further comprises a low-pass amplifier connected electrically downstream the detector, the low-pass amplifier amplifying longer duration voltages within the first time dependent voltage stream a greater amount than shorter duration voltages.

7. The measurement device of claim 1, wherein the level detector comprises at least one diode, at least one resistor, and at least capacitor being connected electrically downstream the at least one diode, the capacitor having a discharge time constant at least ten times greater than a lowest period of increased voltages corresponding to an expected desirable upstream bandwidth.

8. The measurement device of claim 1, wherein the series peak buffer is originally filled with a seed value, the seed value being within a range of expected values relative to a voltage output of a non-linear amplifier.

9. The measurement device of claim 1, wherein the coupler is connected electrically between a user side diplexer filter and a supplier side diplexer filter.

10. The measurement device of claim 1 further comprising an output device to allow for a review by a technician for a purpose of conditioning the upstream bandwidth, the output device being at least one of a monitor, a memory device, a network monitoring location, a hand held device, and a printer.

11. The measurement device of claim 1, wherein the microprocessor further comprises a memory location for a high voltage threshold and a low voltage threshold, each of the high voltage threshold and the low voltage threshold being calculated from a value placed in an average buffer.

* * * * *